United States Patent
Calhoun et al.

(10) Patent No.: US 8,040,861 B2
(45) Date of Patent: Oct. 18, 2011

(54) METHOD AND SYSTEM FOR HIERARCHICAL PROCESSING OF PROTOCOL INFORMATION IN A WIRELESS LAN

(75) Inventors: Patrice R. Calhoun, Pleasanton, CA (US); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 11/679,762

(22) Filed: Feb. 27, 2007

(65) Prior Publication Data

US 2007/0140202 A1    Jun. 21, 2007

Related U.S. Application Data

(63) Continuation of application No. 10/407,584, filed on Apr. 4, 2003, now Pat. No. 7,212,837, which is a continuation-in-part of application No. 10/155,938, filed on May 24, 2002, now abandoned.

(51) Int. Cl.
*H04W 4/00* (2009.01)
*H04J 3/24* (2006.01)

(52) U.S. Cl. .................................... 370/338; 370/349

(58) Field of Classification Search ................ 370/328, 370/338, 331, 465, 349; 455/436, 450, 452.1, 455/452.2
See application file for complete search history.

(56) References Cited

U.S. PATENT DOCUMENTS

| | | | |
|---|---|---|---|
| 5,684,860 A | 11/1997 | Milani et al. | |
| 6,760,318 B1 | 7/2004 | Bims | |
| 6,788,658 B1 * | 9/2004 | Bims ............................ | 370/328 |
| 6,925,070 B2 | 8/2005 | Proctor, Jr. | |
| 2002/0188723 A1 * | 12/2002 | Choi et al. ..................... | 709/225 |
| 2003/0023746 A1 | 1/2003 | Loguinov | |
| 2003/0188723 A1 | 10/2003 | Bard | |
| 2003/0188006 A1 | 10/2003 | Bard | |
| 2003/0198208 A1 | 10/2003 | Koos, Jr. et al. | |
| 2005/0237978 A1 * | 10/2005 | Segal ............................ | 370/331 |

OTHER PUBLICATIONS

International Standard, ISO/IEC 8802-11 ANS/IEEE Std. 802.11, 1999 Edition, Part II: Wireless LAN Medium Access Control (MAC) and Physical Layer (PHY) specifications, pp. 122-137.
"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

*Primary Examiner* — George Eng
*Assistant Examiner* — Michael Faragalla
(74) *Attorney, Agent, or Firm* — Baker Botts L.L.P.

(57) ABSTRACT

In a wireless Local Area Network (WLAN) system, a hierarchical architecture is provided which employs a protocol which divides protocol processing functions between a plurality of substantially identical access elements in which reside time-critical protocol functions, such as acknowledgment and retransmission of packets, and a centralized control element which provides control and management functions related to dynamic configuration of wireless networks, such as processing of network management messages (e.g., authentication and association), load control, channel control, and handoff, processing of physical layer information, and processing of channel characteristics, propagation, interference or noise, for the plurality of access elements on the WLAN without loss of information about the wireless characteristics of the access elements. This hierarchical protocol processing architecture allows the data flow to be centralized for better performance and provides useful access to all the protocol information from the WLAN.

17 Claims, 4 Drawing Sheets

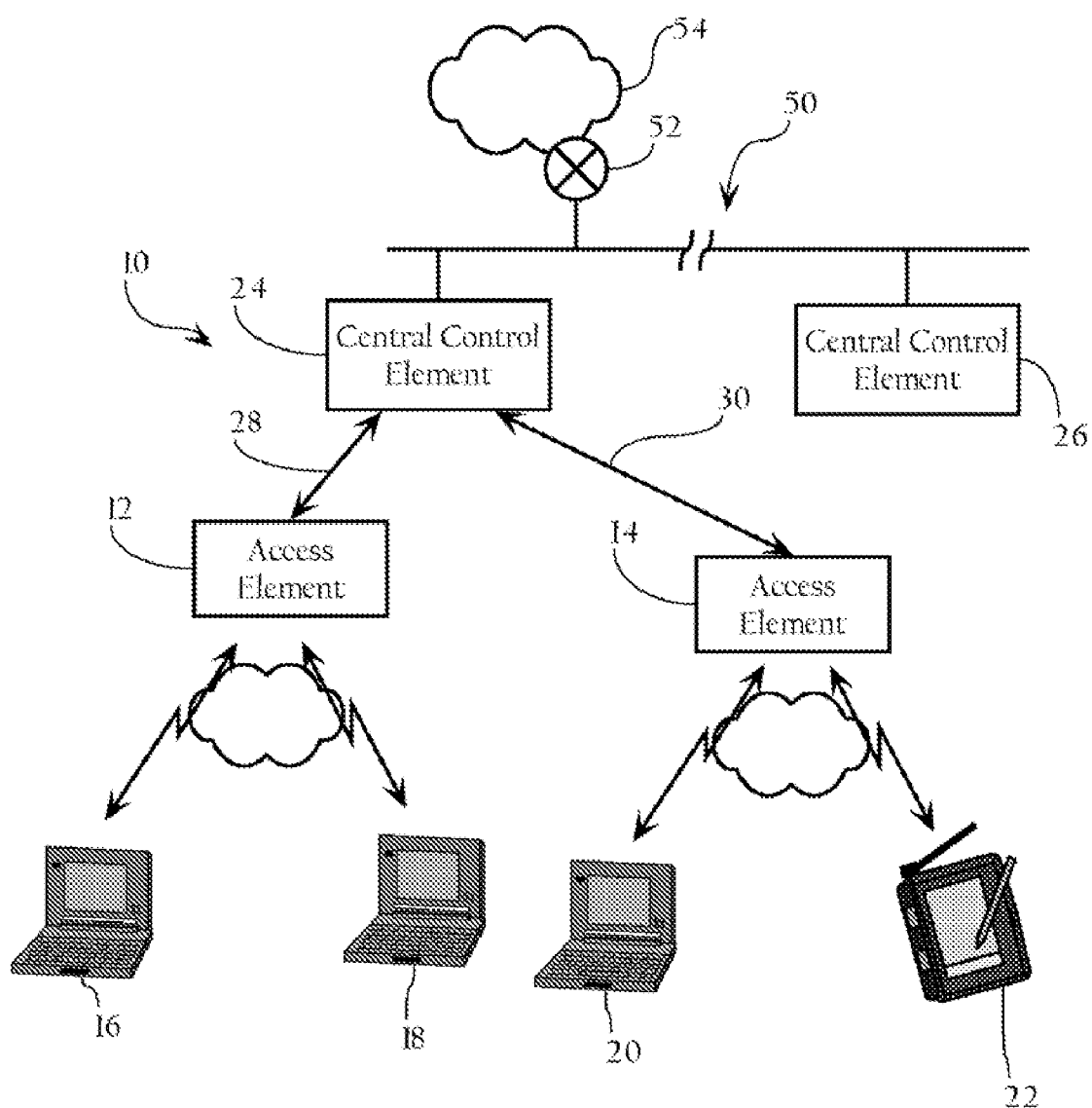
Fig_1

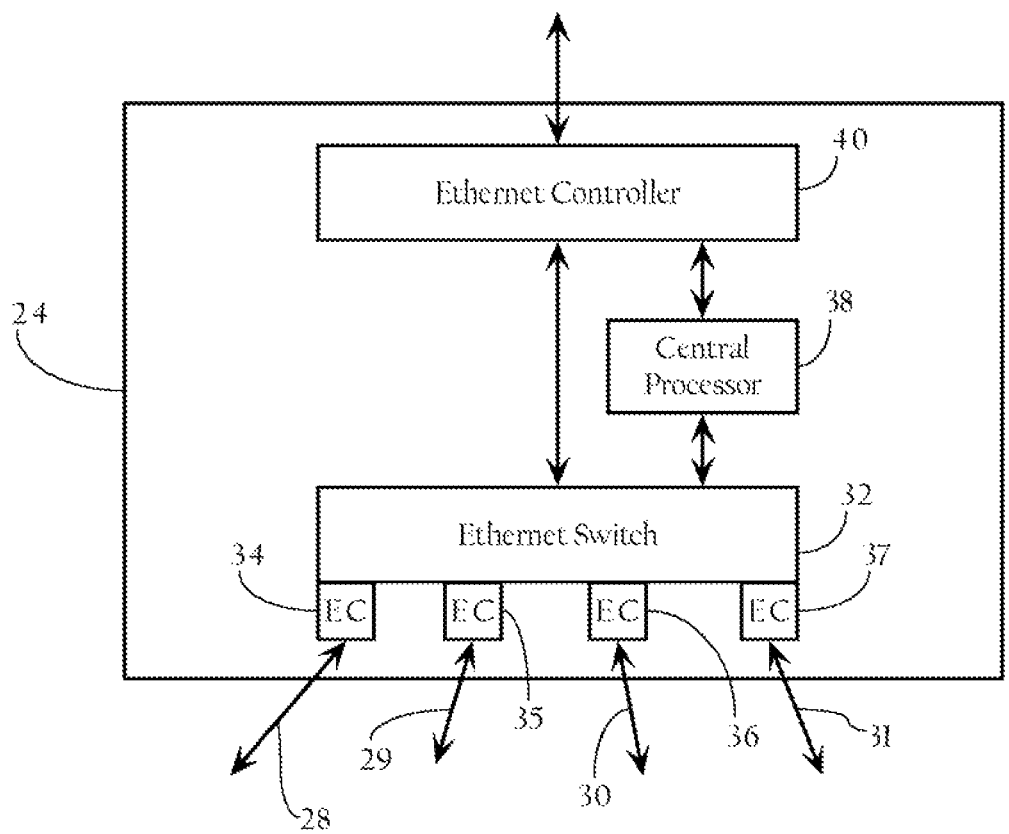
Fig._2
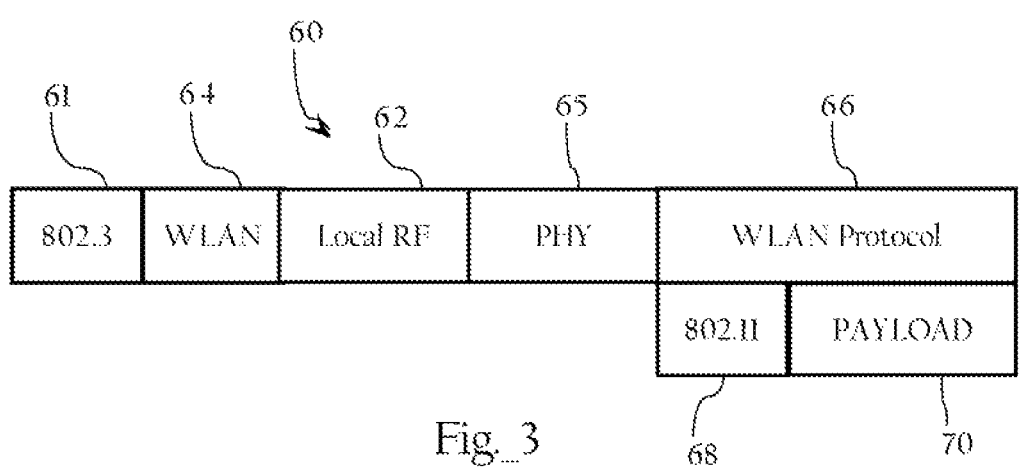
Fig._3

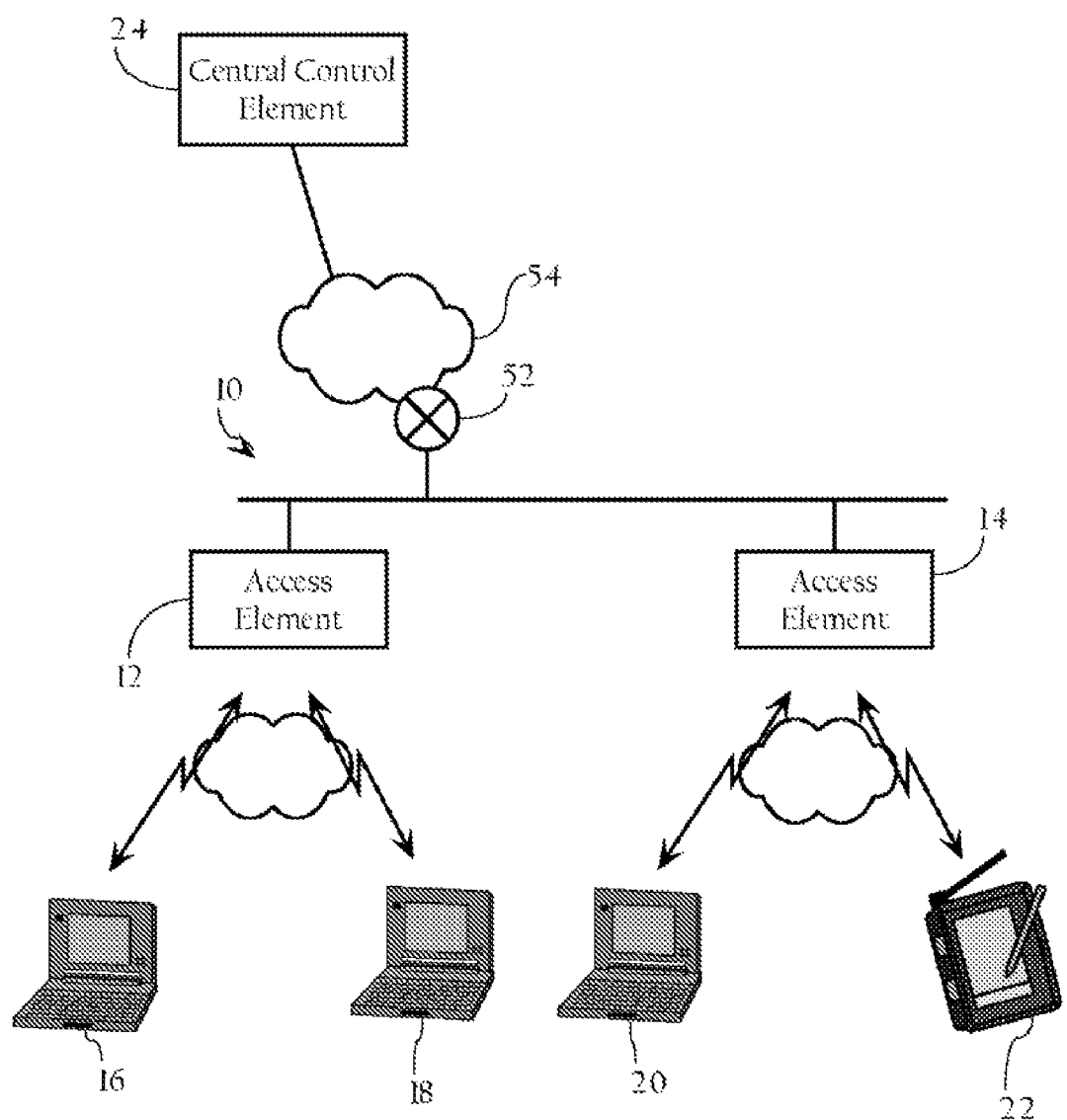
Fig._5

METHOD AND SYSTEM FOR HIERARCHICAL PROCESSING OF PROTOCOL INFORMATION IN A WIRELESS LAN

CROSS-REFERENCES TO RELATED APPLICATIONS

The present application is a continuation of U.S. application Ser. No. 10/407,584 filed Apr. 4, 2003 now U.S. Pat. No. 7,212,837 which is a continuation-in-part of U.S. application Ser. No. 10/155,938 filed May 24, 2002 now abandoned, both entitled "Method and System for Hierarchical Processing of Protocol Information in a Wireless LAN."

STATEMENT AS TO RIGHTS TO INVENTIONS MADE UNDER FEDERAILY SPONSORED RESEARCH OR DEVELOPMIIENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The invention relates to wireless communication protocols, and more particularly to management of communications in a hierarchical wireless Local Area Network system in which the orthogonality between network elements is imperfect.

Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing all physical and wireless media access protocol information from the protocol frames that are, passed onto the infrastructure network This results in uncoordinated handoffs of wireless clients moving between access points. An uncoordinated system of access points makes it difficult to manage a large number of access points, because there is no point of coordination. For example, known prior art hierarchical wireless network systems such as conventional 802.11 systems provide the initial handshaking access authentication and access association at a remote node without attention to overall network loading and signal quality.

This type of distributed architecture creates many problems affecting network management mobility, and performance. Since each wireless LAN access point is a separate managed device, distributed architecture in general introduces many new managed elements in the network without sufficient attention to their global effects. Since the access points act in their own self-interest and are not aware of the actions taken by surrounding access points, they handle mobility, (e.g., handoff actions) as a local event, which significantly increases latency.

What is needed is an architecture with sufficient versatility to optimize network management and performance of a relatively autonomously-managed WLAN.

SUMMARY OF THE INVENTION

According to the invention in a wireless Local Area Network (WLAN) system, a hierarchical architecture is provided which employs a protocol which divides protocol processing functions between a plurality of substantially identical access elements in which reside time-critical protocol functions, such as acknowledgment and retransmission of packets, and a centralized control element which provides control and management functions related to dynamic configuration of wireless networks, such as processing of network management messages (e.g. authentication and association), load control, channel control, and handoff, processing of physical layer information, and processing of channel characteristics, propagation, interference or noise, for the plurality of access elements in the WLAN without loss of information about the wireless characteristics of the access elements. This hierarchical protocol processing architecture allows the data flow to be centralized for better performance and provides useful access to all the protocol information from the WLAN. The hierarchy of protocol processing also allows the central controller to perform additional functions that cannot be accomplished without such hierarchy, such as coordinated assignment of scarce resources and orchestrated balancing of load in the WLAN.

The invention will be better understood by reference to the following detailed description in connection with the accompanying drawings.

BRIEF DESCRIPTION OF THE DRAWINGS

FIG. 1 is a block diagram of a wireless local area network system according to the invention.

FIG. 2 is a block diagram of a central control element according to the invention.

FIG. 3 is a representation of a packet of communication between an access element and a central controller during communication between a client remote element and the access element.

FIG. 5 is a block diagram illustration deployment of a central controller and associated access elements across a public wide area network.

DESCRIPTION OF SPECIFIC EMBODIMENTS OF THE INVENTION

Figure 4:
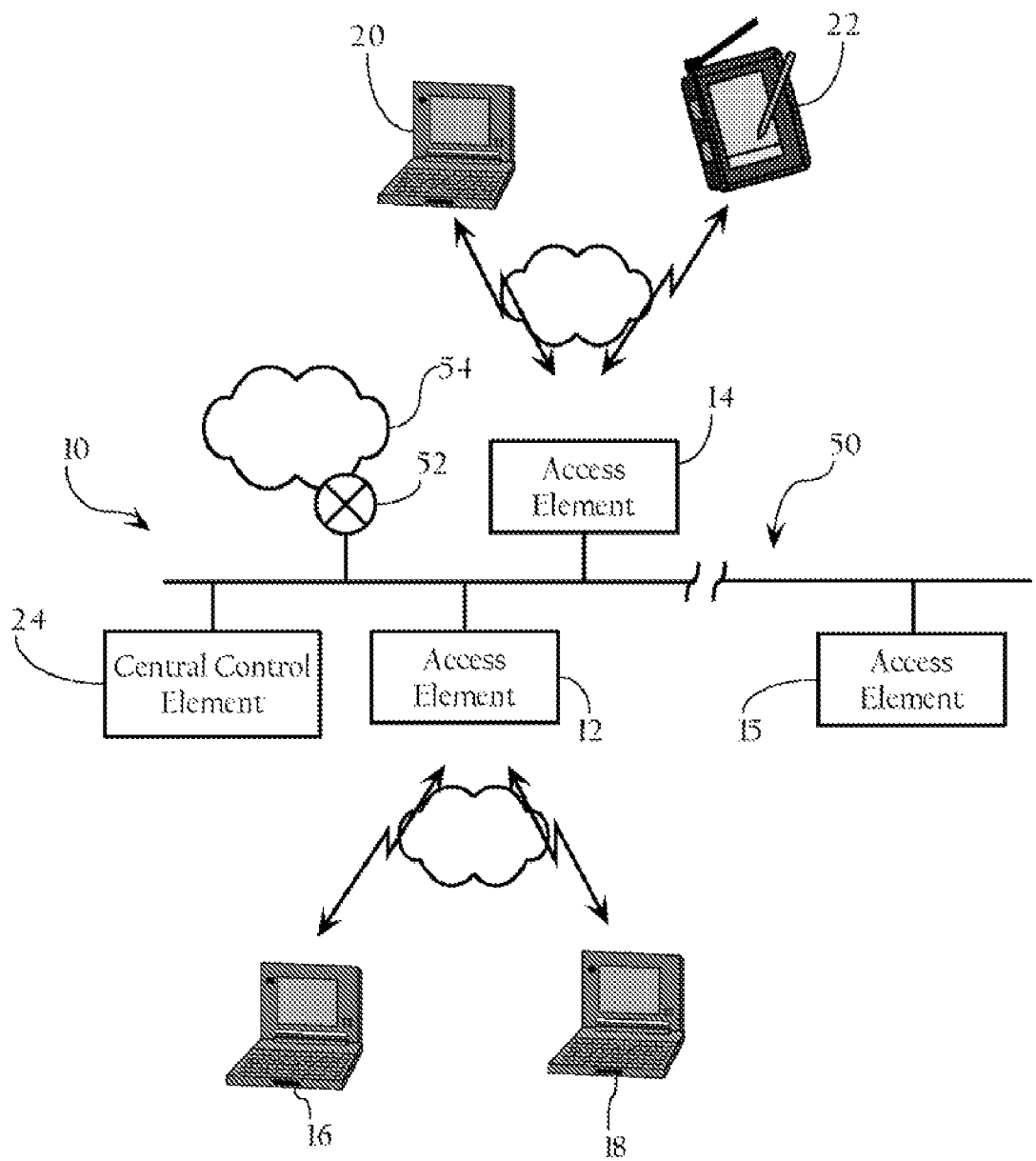
FIG. 4 is a block diagram illustrating an alternative deployment architecture for a wireless network system according to an embodiment of the present invention.

Referring to FIG. 1, there is shown block diagram of a wireless Local Area Network system 10 according to the invention. A specific embodiment of the invention includes the following elements access elements 12, 14 for wireless communication with selected client remote elements 16, 18, 20, 22, central control elements 24, 26, and means for communication between the access elements and the central control elements, typically direct line access 28, 30, but potentially a wireless backbone, fiber or other reliable link. The wireless links between access elements 12, 14, and client remote elements 16, 18, 20, 22, are assumed to be less reliable and not always orthogonal to other communications employing the same medium.

The access elements 12, 14, coupled via communication means using a WLAN protocol (typically IEEE 802.11_) to the client remote elements 16, 18, 20, 22. The communications means 28, 30, between the access elements 12, 14 and the central control elements 24 is typically and Ethernet network, but it could be anything else which is appropriate to the environment. As implemented by the computer code outlined hereinafter the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN network management messages, load control, channel control, and handoff. Among the network management messages are authentication request of the client wireless access elements 12, 14 and association requests of the client wireless access elements 12, 14. The network management messages are passed on from the client remote elements 16, 18; 20, 22 via the access elements 12, 14, such as authentication requests and a authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise.

Referring to FIG. 2, the typical central control element 24 comprises a first Ethernet switch 32 with a plurality of Ethernet interfaces 34-37 coupled to the communication media 28-31 to the access elements, such as access elements 12 and 14, a central processor 38 for providing the communication control functions with the control element from the access elements 12, 14 as well as a wider networks, such as WAN 50 coupled to a router 52 into a global network 54 (FIG. 1) via a further Ethernet controller 40 (FIG. 2).

The Ethernet controller 40 can be a standalone element, or it could be accessed through the Ethernet switch, depending upon design considerations. The central processor 38 communicates control commands with the Ethernet controller 40 and the Ethernet-coupled communication means 28-31 while allowing data to pass directly between Ethernet connections within the central control element 24.

Referring again to FIG. 1, the typical access element 12 performs the RF conversion and time critical portions of the WLAN access protocol. The WLAN protocol frame is encapsulated in an Ethernet frame with information about the radio environment and signal strength, and then is sent to the central control element 24. Similarly, referring to FIG. 3, the access element 12 receives information via a Ethernet control and information packet 60 having an Ethernet 802.3 header 61 from the central control element 24 to control its operation, including but not limited to, selection of a radio channel for operation (local RF field 62), control of the transmit power of the radio (local RF field 62), and configuration of the WLAN parameters (WLAN field 64) and WLAN protocol frames to be transmitted 66, including, Wireless LAN information control (802.11 frame 68) encapsulated with a payload 70.

The central control element 24 receives encapsulated WLAN protocol frames 60 from the access element 12, strips the Ethernet encapsulation 61 from the frame, processes the WLAN protocol frame 66 and the encapsulated information 62, the physical layer information PHY 65 forwarded by the access element 12, and performs the required operations to complete the appropriate protocol operations, e.g. forwarding information to the network to which the WLAN is connected or performing WLAN mobility operations (handoff, channel assignment, prioritizing etc.) The central control element 24 utilizes the additional information encapsulated in the Ethernet frame with the WLAN protocol frame to perform calculations to monitor the radio environment over all of the access elements 12, 14 connected to that specific central control element 24 and to make decisions based on that information along with traffic statistics gleaned from the conventional WLAN, protocol operation, to optimize and manage the performance of the WLAN module as a system (Operations of other central control elements 26 are generally not taken into consideration, as that would be beyond the scope of the present invention.) The local WLAN module decisions include assigning radio channels useable under the 802.11 standard to access elements, setting transmit power levels at the access elements, sharing of traffic load among the access elements according to the invention, and reaction to and correction of failures of the access elements of communications means to those access elements.

In addition, the central control element 24 also sends, via the Ethernet interfaces 28-31 802.3-encapsulated WLAN protocol frames 60 to the access elements 12, 14 for further transmission to the remote client access devices 16, 18, 20, 22 as 802.11 WLAN protocol frames via the wireless medium. Similar protocol frames are used to configure and control the operation of the access elements 12, 14.

The following structure is an example of a message exchanged between the access element 12 and central control element 24 using an 802.3-encapsulated protocol frame of FIG. 3:

```
struct {
    WLANCB      wlan_info;
    RFCB        local_rf_info;
}ControlPacket;
struct {
    WLANCB      wlan_info;
    RFCB        local_rf_info;
    RFHDR       user_rf_header;
    WLANHDR     802_11_header;
    char        *user_data;
}DataPacket;
```

As will be noted, some of the fields can be omitted with loss of generalization.

When the central control element 24 communicates with the access elements 12, 14, the software uses an internal control block within the central processor 38 which contains information specific to the addressed access element 12. The internal control block structure contains the following information:

```
struct {
    int       port_number;
    char      mac_address[6];
    RFStats   rf_stats;
}AccessElementCB;
```

Thus, the central processor 38 is able to collect and store internally certain statistics associated with the specific access element 12. This information is useful for managing loading globally.

In the specific embodiment, there are two main messages exchanged between the central control element 24 and the access elements 12, 14: a data message and a control message. Control messages from the central control element 24 contain local RF information, which when sent to access elements 12, 14 are used to request administrative tasks, such as changing the radio channel. Control messages sent from the access elements 12, 14 are typically used to acknowledge completed requests. Data messages may include local RF information, but they always include PHY 65 and 802.11 wireless LAN protocol headers 68, as well as user data or payload 70. The presence of local RF information 62 in data packets is an optional optimization that reduces the number of packets that would otherwise need to be sent as a separate control message.

The access elements 12, 14 append a header sent back to the central control element 24 which includes local RF information, such as Receive Signal Strength Indication (RSSI), Signal Quality (SQ) and Noise. Finally, when the resulting packet is encapsulated within a wired link layer header (e.g. 802.3), the destination MAC address is set to the address of the central control element 24 with which the access element 12 communicates.

According to the method of the invention, the central control element of a specific embodiment encapsulates a frame within an Ethernet frame, which is then forwarded to the access elements. The following code provides an example of such a process:

```
/*
 * ForwardFrameToAccessElement ( )
 *
 * Input:
 *      frame - The frame to forward to the mobile station.
 *
 * Desc:   This function takes a frame, encapsulates it
 *         within an Ethernet header, and transmits the
 *         frame to the access element responsible for the
 *         mobile station.
 */
int ForwardFrameToRadioElement (char *frame) {
AccessElementCB *element;
char *newframe;
/*
 * Using the destination link layer address, determine
 * the access element the mobile station is currently
 * associated with. If the mobile station has not
 * associated with the central control element, the function
 * will return a NULL; otherwise it will return a pointer to
 * an access element control block.
 */
element = FindAccessElementCB(frame);
if (element == NULL) {
/*
 * Unable to send packet to access element
 * return error
 */
return (-1);
}
/*
 * Perform the bridging function by converting the wired
 * protocol header to the WLAN protocol header and return
 * a pointer to the new frame.
 */
newframe = TranslateToWLANPacket(element, frame);
if (newframe == NULL) {
/* Unable to bridge packet - return error */
return (-1);
}
/*
 * If possible, piggy back a control message within
 * this packet. The function will return a pointer
 * to the new frame.
 */
newframe = AddLocalRFHeader(element, newframe);
if (newframe == NULL) {
/* Unable to append data - return error */
return (-1);
}
/*
 * Add the WLAN header to the packet, which
 * returns a pointer to the new frame.
 */
newframe = AddWLANHeader(element, newframe);
if (newframe == NULL) {
/* Unable to append data - return error */
```

-continued

```
return (-1);
}
/*
 * Encapsulate the 802.11 frame within an Ethernet
 * frame by appending, a wired link layer header. The
 * function will return a pointer to the new frame.
 */
newframe = EncapsulateOverWire(element, newframe);
if (newframe == NULL) {
/* Unable to encapsulate - return error */
return (-1);
}
/*
 * Transmit the frame to the access element
 */
if (SendFrameToAccessElement(element, newframe)) {
/* driver did not send frame */
free(newframe);
return (-1);
}
return (0);
}
```

According to the method of the invention, the central control element of a specific embodiment also receives a frame encapsulated within an Ethernet frame from the access elements. The following code provides an example of such a process:

```
/*
 * ProcessFrameFromAccessElement ( )
 *
 * Input:   frame - The frame from the mobile.
 *
 * Desc:   This function takes a frame from an access
 *         element, processes the data added by the access
 *         element, and transmits the frame towards the
 *         network
 */
int ProcessFrameFromAccessElement (char *frame) {
AccessElementCB *element;
char    *newframe;
/*
 * Use the MAC address within the frame header to
 * identify which access element the packet was sent from.
 * The function must return an access element control
 * block, which contains the information necessary to
 * transmit packets to the remote access element.
 */
element = FindAccessElementCB(frame);
if (element == NULL) {
/*
 * Unable to find access element
 * return error
 */
return (-1);
}
/*
 * Skip the encapsulating header, and retrieve a
 * pointer to the next header.
 */
newframe = SkipEncapsulatingHeader(frame);
if (newframe == NULL) {
/* Unable to skip header */
return (-1);
}
/*
 * Process the WLAN header, and return a pointer
 * to the next header in the packet.
 */
newframe = ProcessWLANHeader(element, newframe);
if (newframe == NULL) {
/* Unable to append data - return error */
return (-1);
}
```

-continued

```
/*
 * Process the Local RF header, and return a pointer
 * to the next header in the packet.
 */
newframe = ProcessLocalRFHeader(element, newframe);
if (newframe == NULL) {
/* Unable to append data - return error */
return (-1);
}
/*
 * Perform the necessary 802.11 access control by validating
 * that the source of the packet was a mobile station permitted
 * to transmit packets from the access element, and that the
 * contents of the packets satisfy the policy verifications. If
 * permitted, perform the bridging function by translating the
 * mobile station's WLAN protocol header to the wired header.
 */
newframe = AuthorizeMobileStationPacket(element, newframe);
if (newframe == NULL) {
/* Unable to encapsulate - return error */
return (-1);
}
/*
 * Transmit the frame onto the backbone network
 */
if (SendFrameToNetwork(newframe)) {
/* driver did not send frame */
free(newframe);
return (-1);
}
return (0);
}
```

In the specific embodiment, routing of the data frames to and from the remote wireless clients through the access element is implemented by the central control element determining which access element is to handle a data frame of a specific remote wireless client, as well as determine the validity of the use of the access element by the remote wireless client, and the routing and destination of the frame from the wireless client.

FIGS. 4 and 5 illustrate alternative deployment or system architectures according to additional embodiments of the present invention. As discussed above, according to the deployment architecture set forth in FIG. 1, the access elements 12, 14 and the central control element 24 tunnel network traffic associated with corresponding remote client elements 16, 18, 20, 22, via direct access lines 28 and 30, respectively. Central control element 24 is also operative to bridge the network traffic between the remote client elements 16, 18, 20, 22, transmitted through the tunnel with corresponding access elements 12, 14.

As FIG. 4 illustrates, according to another embodiment, central control element 24 can communicate with access elements 12, 14 over local area network segment 10. In addition, using a virtual local area network (VLAN) technology and protocols, central control element 24 may also communicate with access element 15 over WAN 50. Suitable VLAN protocols include the IEEE 802.1Q (VLAN tagging) protocol or any other protocol allowing for a logical or virtual link layer connected between the central control element and the access element. According to this deployment architecture, wireless traffic associated with remote client elements 16, 18; 20, 22, according to one embodiment, can be tunneled between the central control element 24 and the access elements 12, 14. In another embodiment, access elements 12, 14 can operate to directly bridge network traffic between remote client elements 16, 18, 20, 22 and WAN 50, while tunneling network management messages, such as authentication and association requests from remote client elements to central control element 24 as discussed above. In addition, according to either embodiment access elements 12, 14, central control element 24, or both access elements 12, 14 and central control element 24 can include layer 2 or layer 3 discovery mechanisms allowing for automatic discovery and configuration across WAN 50 of the components (central control elements and access elements) effecting the wireless network environment.

FIG. 5 illustrates deployment of the central control element 24 and the access elements 12, 14 over a global network 54, such as the Internet, across a point-to-point connection, or across subnets without a VLAN implementation. In light of the transmission delays associated with public networks, according to one embodiment, this deployment architecture features centralization of the link layer management functions with central control element 24, such as authentication and association (as discussed above), and distribution of the real-time or data path functions across the access elements 12, 14, such as bridging of wireless network traffic between LAN 10 and remote client elements 16, 18, 20, 22. This deployment mode allows an Internet Service Provider (ISP), for example, to deploy access elements 12, 14 at a so-called "hot-spot," while installing central control element 24 within the network operations or other control center associated with the ISP.

According to deployments across global network 54, the access elements 12, 14 are configured with the URL, IP or other network layer address of a central control element 24. In one embodiment, the access elements 12, 14 may also be configured with the URL or IP address of a failover central control element. Accordingly, the network management frames or data are transmitted (or tunneled) between the access elements 12, 14 and the central control element 24, encapsulated in IP packets using any suitable transport layer protocols (e.g., TCP, UDP, etc.). In one embodiment, central control element 24 implements HTTP server functionality to establish connections with the access elements and respond to management frames transmitted by the access elements 12, 14. Of course, any suitable application layer protocols and technologies can be used, such as SNMP, SSH, etc.

In one embodiment, central control element 24 and access elements 12, 14 implement a ratification-based link layer management scheme to compensate for the transmission delays associated with global networks. According to one embodiment, each access element 12, 14 operates to initially perform link layer management functions (such as authentication and association) on an autonomous basis, allowing remote client elements 16, 18, 20, 22 to establish wireless connections. However, access elements 12, 14 also tunnel the network management frames (e.g., authentication and association requests from remote client elements 16, 18, 20, 22) to central control element 24 for ratification. Specifically, central control element 24 receives the encapsulated management frames, or frames including information derived from the management frames, and processes the frames to determine whether to ratify the actions of the corresponding access element. In one embodiment, central control element 24 can ratify the action by taking no action or transmitting an explicit ratification message to the corresponding access element. It the central control element 24 determines that the authentication or association request should have been denied, it transmits a response to the corresponding access element directing it to terminate the connection with the remote client element identified in the response.

Then invention has been explained with reference to specific embodiments. Other embodiments will be evident to those of ordinary skill in the art. It is therefore not intended for the invention to be limited, except as indicated by the appended claims.

What is claimed is:

1. An apparatus, comprising
a network interface for communication with one or more access elements;
a processor operatively coupled to the network interface, wherein the processor is operative to
establish a respective communications tunnel with a plurality of access elements for transmission of WLAN protocol frames associated with one or more remote client elements, wherein one or more of the WLAN protocol frames are encapsulated with a header including local radio frequency (RF) information, and wherein one or more of the WLAN protocol frames are WLAN management frames;
manage and control wireless connections between the plurality of access elements and one or more corresponding remote client elements;
process the one or more WLAN management frames forwarded by the plurality of access elements to dynamically configure a wireless Local Area Network system comprising the plurality of access elements;
select radio frequency channels for assignment to the plurality of access elements;
transmit to the plurality of access elements control messages identifying the selected radio frequency channel;
receive, via the communications tunnel with an access element of the one or more access elements, an encapsulated WLAN protocol frame from a first remote client element of the one or more remote client elements;
translate the WLAN protocol frame to a wired network frame; and
transmit the wired network frame across a computer network.

2. The apparatus of claim 1 wherein the local radio frequency (RF) information comprises signal strength information.

3. The apparatus of claim 1 wherein the local radio frequency (RF) information comprises one or more of Receive Signal Strength Indication (RSSI), Signal Quality (SQ) or Noise.

4. The apparatus of claim 1 wherein the processor is further operative to dynamically configure the wireless Local Area Network by processing information collected at the one or more access elements on received signal strength, interference or noise corresponding to signals transmitted by remote client elements.

5. The apparatus of claim 1 wherein one or more of the WLAN protocol frames are data frames transmitted by the one or more corresponding remote client elements.

6. The apparatus of claim 1 wherein the processor is further operative to bridge network traffic between the one or more remote client elements and a wired computer network.

7. The apparatus of claim 1 wherein the respective communications tunnel is a network layer or link layer tunnel.

8. The apparatus of claim 1 wherein the processor is further operative to maintain a respective control block structure comprising a link layer address of the one or more access elements.

9. The apparatus of claim 8 wherein the processor is further operative to maintain one or more statistics associated with the one or more access elements in the respective control block structure.

10. The apparatus of claim 8 wherein the processor is further operative to perform access control operations on one or more WLAN protocol frames received on the respective communications tunnel with the one or more access elements.

11. The apparatus of claim 1 wherein the processor is further operative to
receive, via the respective communications tunnel, an encapsulated WLAN protocol frame from a first remote client element of the one or more remote client elements;
perform one or more access control operations on the WLAN protocol frame;
translate the WLAN protocol frame to a wired network frame; and
transmit the wired network frame across a computer network.

12. An apparatus operative in a wireless network system, comprising
a first network interface for communication with a central control element over a first computer network;
a wireless network interface for wireless communication with at least one client remote element, and
a processor operatively coupled to the first network interface and the wireless network interface, wherein the processor is operative to
establish a communications tunnel with central control element for transmission of WLAN protocol frames associated with the one or more remote client elements,
receive WLAN protocol frames from one or more remote client elements;
provide, to corresponding remote client elements, acknowledgments of WLAN protocol frames transmitted by the one or more remote client elements;
append local radio frequency (RF) information to the WLAN protocol frames in respective encapsulating headers;
forward the encapsulated WLAN protocol frames to the central control element for processing;
receive a control message from the central control element identifying a selected radio frequency channel; and
forward wireless local area network management messages transmitted by remote client elements to the central control element.

13. The apparatus of claim 12 wherein the processor is further operative to bridge network traffic between the first computer network and the one or more remote client elements.

14. The apparatus of claim 12 wherein the communications tunnel is a network layer tunnel.

15. An apparatus operative in a wireless network system, comprising
a first network interface for communication with a central control element over a first computer network, wherein the first computer network is a wide area network;
a wireless network interface for wireless communication with at least one client remote element, and
a processor operatively coupled to the first network interface and the wireless network interface, wherein the processor is operative to
establish a communications tunnel over the first computer network with central control element for transmission of WLAN protocol frames associated with the one or more remote client elements, wherein the WLAN protocol frames are encapsulated with Internet Protocol (IP) headers,
receive WLAN protocol frames transmitted from one or more remote client elements;

autonomously acknowledge receipt of the WLAN protocol frames transmitted by the one or more remote client elements;

forward the IP-header encapsulated WLAN protocol frames in the communications tunnel to the central control element for processing;

receive WLAN protocol frames from the tunnel with the central control element; and transmit the received WLAN protocol frames to one or more remote client elements.

16. The apparatus of claim 15 wherein the processor is further operative to append local radio frequency (RF) information to the WLAN protocol frames in respective encapsulating headers.

17. The apparatus of claim 16 wherein the processor is further operative to receive a control message identifying a selected radio frequency channel.

* * * * *